United States Patent
Van Lieshout et al.

(10) Patent No.: US 6,850,759 B2
(45) Date of Patent: Feb. 1, 2005

(54) REDUCING SIGNALING IN RNSAP PROTOCOL UPON CELL CHANGE IN CELLULAR TELECOMMUNICATIONS NETWORK

(75) Inventors: Gert-Jan Van Lieshout, Apledoorn (NL); Göran Rune, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 365 days.

(21) Appl. No.: 09/789,536

(22) Filed: Feb. 22, 2001

(65) Prior Publication Data

US 2004/0203714 A1 Oct. 14, 2004

(51) Int. Cl.[7] .................................................. H04Q 7/20
(52) U.S. Cl. .................................................... 455/426.1
(58) Field of Search ................................ 455/436, 426, 455/426.1

(56) References Cited

FOREIGN PATENT DOCUMENTS

| WO | 95/15665 | 6/1995 |
| WO | 99/66740 A | 12/1999 |
| WO | 00/54521 A | 9/2000 |
| WO | 00/54522 A | 9/2000 |
| WO | 00/76245 A | 12/2000 |
| WO | WO 02/067609 A1 * | 8/2002 |

OTHER PUBLICATIONS

Third Generation Partnership Project (3GPP) Technical Specification 3G TS 25.423, v.3.4.0 "Utran Iur Interface RNSAP Signaling." (Release 1999), (Dec. 2000).

Third Generation Partnership Project (3GPP) Technical Specification 25.331, v.3.5.0 "RRC Protocal Specification.", (Release 1999), (Jan. 2000).

Third Generation Partnership Project (3GPP) Technical Specification 25.423, v.3.4.0 "Utran Iur Interface RNSAP Signalling", (Release 1999), (Dec. 2000).

Third Generation Partnership Project (3GPP) Technical Specification 25.211, v.3.5.0 "Physical Channels and Mapping of Transport Channels Onto Physical Channels (FDD)" (Release 1999), (Dec. 2000).

Third Generation Partnership Project (3GPP) Technical Specification 25.221, v.3.5.0 "Physical Channels and Mapping of Transport Channels Onto Physical Channels (TDD)" (Release 1999), (Dec. 2000).

Third Generation Partnership Project (3GPP) Technical Specification 25.435, v.3.5.0 "Utran Iub Interface User Plane Protocols for Common Transport Channel Data Streams" (Release 1999) (Dec. 2000).

* cited by examiner

Primary Examiner—William Cumming
(74) Attorney, Agent, or Firm—Nixon & Vanderhye, P.C.

(57) ABSTRACT

In a cellular telecommunications system, when a user equipment unit (UE) [30] seeks to use a FACH common transport channel in a cell controlled by the drift radio network controller (DRNC) [$26_2$], the drift radio network controller (DRNC) signals to a serving radio network controller (SRNC) [$26_1$] whether the drift radio network controller (DRNC) requires initiation of a Common Transport Channel Resource Initialization Procedure. If the signaling indicates that the drift radio network controller (DRNC) does not require initiation of the Common Transport Channel Resource Initialization Procedure, the serving radio network controller (SRNC) has discretion whether to initiate the Common Transport Channel Resource Initialization Procedure with respect to the user equipment unit (UE) in the cell.

20 Claims, 3 Drawing Sheets

REDUCING SIGNALING IN RNSAP PROTOCOL UPON CELL CHANGE IN CELLULAR TELECOMMUNICATIONS NETWORK

BACKGROUND

1. Field of the Invention

The present invention pertains to wireless telecommunications, and particularly to signaling required for supporting common transport channels in a radio access network for a radio connection with a user equipment unit controlled by a serving radio network controller (SRNC) when the user equipment unit moves into a new cell controlled by a drift radio network controller (DRNC).

2. Related Art and Other Considerations

In a typical cellular radio system, mobile user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

One example of a radio access network is the Universal Mobile Telecommunications (UMTS) Terrestrial Radio Access Network (UTRAN). The UTRAN is a third generation system which in some respects builds upon the radio access technology known as Global System for Mobile communications (GSM) developed in Europe. UTRAN is essentially a wideband code division multiple access (W-CDMA) system.

As those skilled in the art appreciate, in W-CDMA technology a common frequency band allows simultaneous communication between a user equipment unit (UE) and plural base stations. Signals occupying the common frequency band are discriminated at the receiving station through spread spectrum CDMA waveform properties based on the use of a high speed, pseudo-noise (PN) code. These high speed PN codes are used to modulate signals transmitted from the base stations and the user equipment units (UEs). Transmitter stations using different PN codes (or a PN code offset in time) produce signals that can be separately demodulated at a receiving station. The high speed PN modulation also allows the receiving station to advantageously generate a received signal from a single transmitting station by combining several distinct propagation paths of the transmitted signal. In CDMA, therefore, a user equipment unit (UE) need not switch frequency when handoff of a connection is made from one cell to another. As a result, a destination cell can support a connection to a user equipment unit (UE) at the same time the origination cell continues to service the connection. Since the user equipment unit (UE) is always communicating through at least one cell during handover, there is no disruption to the call. Hence, the term "soft handover." In contrast to hard handover, soft handover is a "make-before-break" switching operation.

The Universal Mobile Telecommunications (UMTS) Terrestrial Radio Access Network (UTRAN) accommodates both circuit switched and packet switched connections. In this regard, in UTRAN the circuit switched connections involve a radio network controller (RNC) communicating with a mobile switching center (MSC), which in turn is connected to a connection-oriented, external core network, which may be (for example) the Public Switched Telephone Network (PSTN) and/or the Integrated Services Digital Network (ISDN). On the other hand, in UTRAN the packet switched connections involve the radio network controller communicating with a Serving GPRS Support Node (SGSN) which in turn is connected through a backbone network and a Gateway GPRS support node (GGSN) to packet-switched networks (e.g., the Internet, X.25 external networks)

There are several interfaces of interest in the UTRAN. The interface between the radio network controllers (RNCs) and the core network(s) is termed the "Iu" interface. The interface between a radio network controller (RNC) and its base stations (BSs) is termed the "Iub" interface. The interface between the user equipment unit (UE) and the base stations is known as the "air interface" or the "radio interface" or "Uu interface". In some instances, a radio connection involves both a Serving or Source RNC (SRNC) and a target or drift RNC (DRNC), with the SRNC controlling the radio connection but with one or more radio links of the radio connection being handling by the DRNC. An Inter-RNC transport link can be utilized for the transport of control and data signals between Source RNC and a Drift or Target RNC, and can be either a direct link or a logical link as described, for example, in International Application Number PCT/US94/12419 (International Publication Number WO 95/15665). An interface between radio network controllers (e.g., between a Serving RNC [SRNC] and a Drift RNC [DRNC]) is termed the "Iur" interface.

The radio network controller (RNC) controls the UTRAN. In fulfilling its control role, the RNC manages resources of the UTRAN. Such resources managed by the RNC include (among others) the downlink (DL) power transmitted by the base stations; the uplink (UL) interference perceived by the base stations; and the hardware situated at the base stations.

Those skilled in the art appreciate that, with respect to a certain RAN-UE connection, an RNC can either have the role of a serving RNC (SRNC) or the role of a drift RNC (DRNC). If an RNC is a serving RNC (SRNC), the RNC is in charge of the radio connection with the user equipment unit (UE), e.g., it has full control of the radio connection within the radio access network (RAN). A serving RNC (SRNC) is connected to the core network. On the other hand, if an RNC is a drift RNC (DRNC), its supports the serving RNC (SRNC) by supplying radio resources (within the cells controlled by the drift RNC (DRNC)) needed for a radio connection with the user equipment unit (UE). A system which includes the drift radio network controller (DRNC) and the base stations controlled over the Iub Interface by the drift radio network controller (DRNC) is herein referenced as a DRNC subsystem or DRNS.

When a radio connection between the radio access network (RAN) and user equipment unit (UE) is being established, the radio access network (RAN) decides which RNC is to be the serving RNC (SRNC) and, if needed, which RNC is to be a drift RNC (DRNC). Normally, the RNC that controls the cell where the user equipment unit (UE) is located when the radio connection is first established is initially selected as the serving RNC (SRNC). As the user equipment unit (UE) moves, the radio connection is maintained even though the user equipment unit (UE) may move into a new cell, possibly even a new cell controlled by another RNC. That other RNC becomes a drift RNCs (DRNC) for RAN-UE connection. An RNC is said to be the Controlling RNC (CRNC) for the base stations connected to it by an Iub interface. This CRNC role is not UE specific. The CRNC is, among other things, responsible for handling radio resource management for the cells in the base stations connected to it by the Iub interface.

In the Universal Mobile Telecommunications (UMTS) Terrestrial Radio Access Network (UTRAN), on the radio interface there are Common Transport Channels and Dedicated Transport Channels. The Common Transport Channels are the uplink Random Access Channel (RACH), the downlink Forward Access Channel (FACH), uplink Common Packet Channel (CPCH), Uplink Shared Channel (USCH), and Downlink Shared Channel (DSCH). The Dedicated Transport Channels are the Dedicated Channel (DCH). The transport channels in the UMTS are described in one or more of the following specifications (all of which are incorporated herein by reference in their entirety): (1) Third Generation Partnership Project (3GPP) Technical Specification 25.211, v.3.5.0 "Physical Channels and Mapping of Transport Channels Onto Physical Channels (FDD)"; (2) Third Generation Partnership Project (3GPP) Technical Specification 25.221, v.3.5.0 "Physical Channels and Mapping of Transport Channels Onto Physical Channels (TDD)"; (3) Third Generation Partnership Project (3GPP) Technical Specification 25.331, v.3.5.0 "RRC Protocol Specification."

The downlink Forward Access Channel (FACH) is a common transport channel used for transporting data to many different user equipment units (UEs). A multiplexing over the downlink Forward Access Channel (FACH) is achieved by including a UE identity in every FACH data transmission. The CRNC [currently assuming the role as drift radio network controller (DRNC) for a user equipment unit (UE)] schedules the data received from the serving radio network controller (SRNC) for the different user equipment units (UEs) on the downlink Forward Access Channel (FACH).

A downlink Forward Access Channel (FACH) is mapped onto a physical channel known as the Secondary Common Control Channel (S-CCPCH). Each Secondary Common Control Channel (S-CCPCH) may carry more than one downlink Forward Access Channel (FACH). Details of mapping of transport channels onto physical channels are provided in the first two of the above-listed 3GPP specifications.

In addition to transporting information related to several user equipment units (UEs) on the downlink Forward Access Channel (FACH), a further multiplexing level is used by transporting multiple logical channels for one user equipment unit (UE) over the downlink Forward Access Channel (FACH). There are three types of such logical channels. The first type is the Common Control Channel (CCCH) which extends between a CRNC and the user equipment unit (UE). A second type is the Dedicated Control Channel (DCCH) which extends between the serving radio network controller (SRNC) and the user equipment unit (UE). A third type is the Dedicated Transport Channel (DTCH) which extends between the serving radio network controller (SRNC) and the user equipment unit (UE).

The Common Control Channel (CCCH) extends between a CRNC and the user equipment unit (UE). As such, there is no direct transport of the Common Control Channel (CCCH) over the Iur interface. However, the CRNC may decide to relay certain information received on the Common Control Channel (CCCH) to the serving radio network controller (SRNC). The serving radio network controller (SRNC) may also ask the CRNC to transmit certain information over the Common Control Channel (CCCH). The transport of this information over the Iur interface is handled by the Radio Network Subsystem Application Protocol (RNSAP).

The data received/sent on the Dedicated Transport Channel (DTCH) and Dedicated Control Channel (DCCH) logical channels is transported on so-called "transport bearers" over the Iur interface. One transport bearer can be used to transport DTCH/DCCH information received/to be sent on downlink Forward Access Channel (FACH) transport channels for multiple user equipment units (UEs).

The Iur interface has two planes, namely a control plane (CP) and a user plane (UP). In the control plane (CP), the serving radio network controller (SRNC) and drift radio network controller (DRNC) communicate using Radio Network Subsystem Application Protocol (RNSAP). Radio Network Subsystem Application Protocol (RNSAP) is transported over a reliable signaling bearer, as described in Third Generation Partnership Project (3GPP) Technical Specification 3G TS 25.423, v.3.4.0 "UTRAN Iur Interface RNSAP Signaling."

The transport of data received/transmitted on the radio interface occurs in the user plane (UP). In the user plane (UP) the data is transported over unreliable transport bearers. For FACH transport channels, information related to multiple user equipment units (UEs) can be multiplexed onto one transport bearer, as described in Third Generation Partnership Project (3GPP) Technical Specification 3G TS 25.425, v.3.3.0 "UTRAN Iur Interface User Plane Protocols for CCH Data Streams."

The serving radio network controller (SRNC) is responsible for establishing the necessary transport bearers between the serving radio network controller (SRNC) and the drift radio network controller (DRNC). For example, when Dedicated Control Channel (DCCH)/Dedicated Transport Channel (DTCH) communication with a new user equipment unit (UE) needs to be established over FACH and insufficient transport capability is available on any of the existing transport bearers, the serving radio network controller (SRNC) initiates establishment of a new transport bearer.

When a user equipment unit (UE) is using the RACH/FACH common channels (e.g., UE RRC state is CELL_FACH), the first message sent from the user equipment unit (UE) upon entering a new cell is a CELL-UPDATE RRC message. The CELL-UPDATE RRC message serves as a kind of registration message to let the UTRAN know the new position of the user equipment unit (UE). The UTRAN then decides how to handle this user equipment unit (UE). If UTRAN decides that the user equipment unit (UE) is to remain on common channels, the user equipment unit (UE) will be told to remain on common channels. The user equipment unit (UE) then monitors the FACH for any downlink transmission, and uses a certain RACH for uplink access. This case of the user equipment unit (UE) using common channels thus differs from a case of a user equipment unit (UE) using dedicated channels, since usage of dedicated channels may set up a soft handover situation in which new radio links or connection legs with the user equipment unit (UE) are established via the new cell.

When the user equipment unit (UE) is using the FACH transport channels, heretofore the serving radio network controller (SRNC) initiates a procedure known as the RNSAP Common Transport Channel Resource Initialization Procedure every time the user equipment unit (UE) moves from one cell to another cell in the DRNS, and the user equipment unit (UE) is to use common channels in the new cell. The Common Transport Channel Resource Initialization Procedure is a RNSAP procedure, initiated by the serving radio network controller (SRNC), which comprises messages transmitted between the serving radio network controller (SRNC) and the drift radio network controller (DRNC). Execution of the Common Transport Channel Resource Initialization Procedure is required to enable the drift radio network controller (DRNC) to perform certain activities, and to provide the serving radio network controller (SRNC) with, e.g., information concerning supported Transport Block (TB) sizes and flow control information. In addition, the Common Transport Channel Resource Initialization Procedure is executed when the serving radio network controller (SRNC) determines that another transport bearer over the Iur interface should be requested. Each of these are discussed briefly subsequently.

In every UTRAN cell, the data transported over the FACH transport channel needs to comply to certain length restrictions. These length restrictions may vary per cell and are used by the serving radio network controller (SRNC) for determining how to segment the Dedicated Control Channel (DCCH)/Dedicated Transport Channel (DTCH) data. When a user equipment unit (UE) moves from one cell to another, the serving radio network controller (SRNC) needs to be provided with information about the new applicable length restrictions. This information is provided by the CRNC in the RNSAP Common Transport Channel Resource Initialization Procedure.

Regarding flow control, the CRNC, in its role as drift radio network controller (DRNC), provides the serving radio network controller (SRNC) with a number of "credits". These credits indicate how much data the serving radio network controller (SRNC) is allowed to send to the CRNC. If the SRNC has no credits remaining, it has to wait for new credits received from the CRNC before it can send further data to the CRNC. Thus, the credit mechanism provides a means to the CRNC to control the amount of data it will receive from a certain SRNC for a certain user equipment unit (UE). When the user equipment unit (UE) moves from one cell to another cell, the load conditions may vary. In such case, the currently specified solutions to the credit mechanism is always restarted. This means that the serving radio network controller (SRNC) has to obtain new credits from the CRNC before it can start transmission in the new cell. The credits applicable for the new cell are supplied by the CRNC to the serving radio network controller (SRNC) in the RNSAP Common Transport Channel Resource Initialization Procedure.

As indicated above, it is the serving radio network controller (SRNC) which decides if a new transport bearer should be established over the Iur interface or not. If the serving radio network controller (SRNC) decides that a new transport bearer shall be established, the RNSAP Common Transport Channel Resource Initialization Procedure provides the SRNC with relevant DRNC-related information to enable such establishment.

Execution of the Common Transport Channel Resource Initialization Procedure accounts for essentially half of the Iur signaling required to handle the situation in which a user equipment unit (UE) moves from one cell in the DRNS to another cell in the DRNS.

What is needed, therefore, and an object of the present invention, is a technique for decreasing Iur signaling when a cell change occurs in a DRNS.

BRIEF SUMMARY OF THE INVENTION

In a cellular telecommunications system, when a user equipment unit (UE) seeks to use a FACH common transport channel in a cell controlled by the drift radio network controller (DRNC), the drift radio network controller (DRNC) signals to a serving radio network controller (SRNC) whether the drift radio network controller (DRNC) requires initiation and hence execution of a Common Transport Channel Resource Initialization Procedure. If the signaling indicates that the drift radio network controller (DRNC) does not require initiation of the Common Transport Channel Resource Initialization Procedure, the serving radio network controller (SRNC) has discretion whether to initiate the Common Transport Channel Resource Initialization Procedure with respect to the user equipment unit (UE) in the cell.

Advantageously, in one example implementation the signaling concerning initiation or not of the Common Transport Channel Resource Initialization Procedure is performed using an existing signaling message between the drift radio network controller (DRNC) and the serving radio network controller (SRNC), e.g., a RNSAP UL Signaling Transfer message.

In one aspect of the invention, the drift radio network controller (DRNC) determines whether the drift radio network controller (DRNC) requires initiation of the Common Transport Channel Resource Initialization Procedure, on the basis of differences in one or more of the following for cells controlled by the drift radio network controller (DRNC): (a) length restrictions of data transported over the FACH transport channel; and (b) flow control conditions.

Regardless of the signaling from the drift radio network controller (DRNC), the serving radio network controller (SRNC) can, at its own discretion, initiate the Common Transport Channel Resource Initialization Procedure if the serving radio network controller (SRNC) determines that a new transport bearer is required over an interface between the serving radio network controller (SRNC) and the drift radio network controller (DRNC).

The present invention thus decreases the signaling performed between the serving radio network controller (SRNC) and drift radio network controller (DRNC) when a user equipment unit (UE) moves from one cell under control of the drift radio network controller (DRNC) to another cell under control of the drift radio network controller (DRNC) while using the RACH/FACH common transport channels over the radio interface. The invention enables a large decrease (up to as much as fifty percent) in the amount of signaling between the serving radio network controller (SRNC) and drift radio network controller (DRNC) while the user equipment unit (UE) is using the FACH (which can be utilized in combination with RACH or CPCH) by eliminating the need to initiate the Common Transport Channel Resource Initialization Procedure at every cell change under the drift radio network controller (DRNC).

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail.

Figure 1:
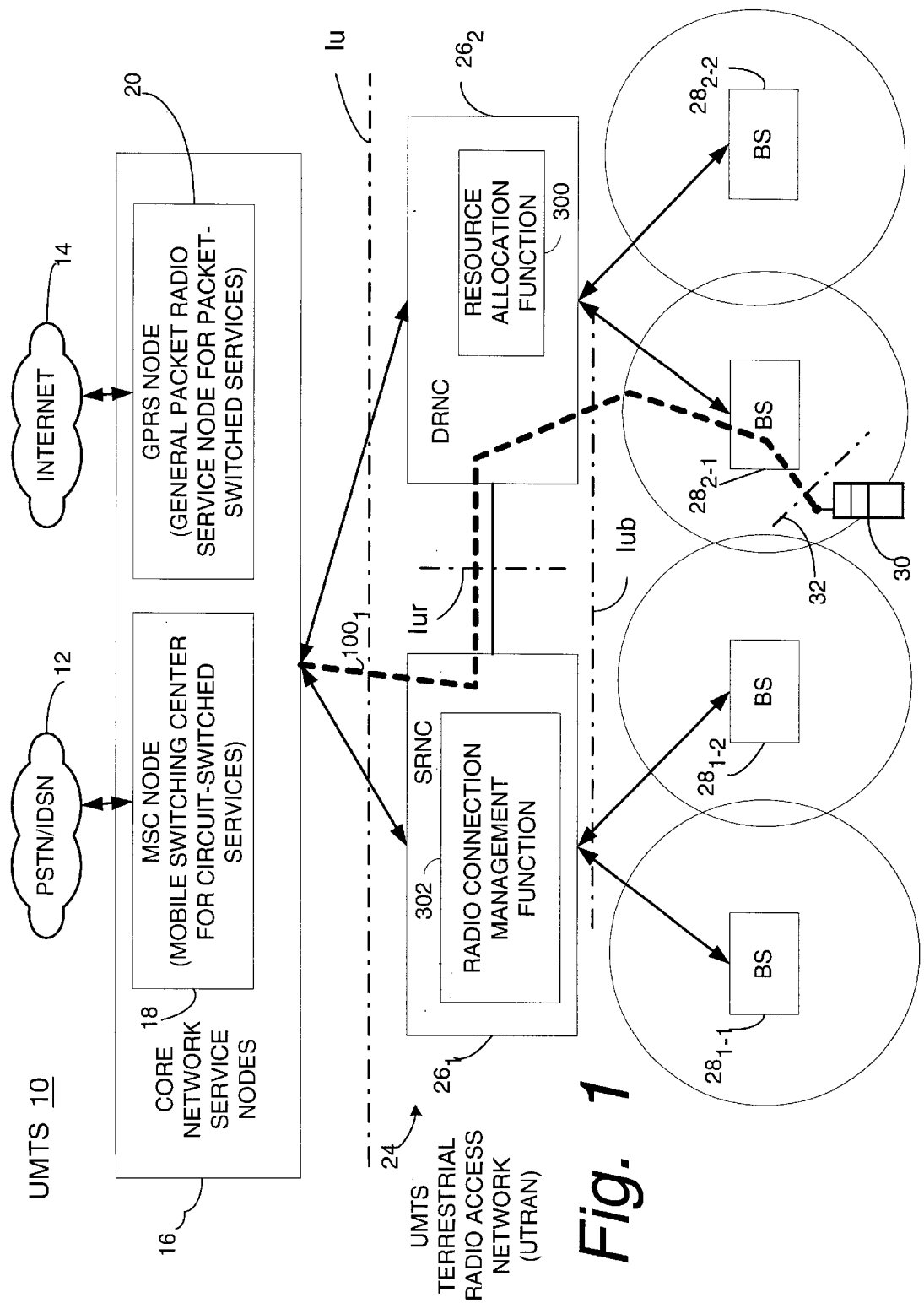
FIG. 1 is diagrammatic view of example mobile communications system in which the present invention may be advantageously employed.

The present invention is described in the non-limiting, example context of a universal mobile telecommunications (UMTS) 10 shown in FIG. 1. A representative, connection-oriented, external core network, shown as a cloud 12 may be for example the Public Switched Telephone Network (PSTN) and/or the Integrated Services Digital Network (ISDN). A representative, connectionless-oriented external core network shown as a cloud 14, may be for example the Internet. Both core networks are coupled to their corresponding service nodes 16. The PSTN/ISDN connection-oriented network 12 is connected to a connection-oriented service node shown as a Mobile Switching Center (MSC) node 18 that provides circuit-switched services. The Internet connectionless-oriented network 14 is connected to a General Packet Radio Service (GPRS) node 20 tailored to provide packet-switched type services which is sometimes referred to as the serving GPRS service node (SGSN).

Each of the core network service nodes 18 and 20 connects to a UMTS Terrestrial Radio Access Network (UTRAN) 24 over a radio access network (RAN) interface referred to as the Iu interface. UTRAN 24 includes one or more radio network controllers (RNCs) 26. For sake of simplicity, the UTRAN 24 of FIG. 1 is shown with only two RNC nodes, particularly serving radio network controller (SRNC) $26_1$ and drift radio network controller (DRNC) $26_2$. Each RNC 26 is connected to a plurality of base stations (BS) 28. For example, and again for sake of simplicity, two base station nodes are shown connected to each RNC 26. In this regard, SRNC $26_1$ serves base station $28_{1\text{-}1}$ and base station $28_{1\text{-}2}$, while SRNC $26_2$ serves base station $28_{2\text{-}1}$ and base station $28_{2\text{-}2}$. It will be appreciated that a different number of base stations can be served by each RNC, and that RNCs need not serve the same number of base stations. Moreover, FIG. 1 shows that an RNC can be connected over an Iur interface to one or more other RNCs in the URAN 24.

In the illustrated embodiments, each base station 28 is shown as serving one cell. Each cell is represented by a circle which surrounds the respective base station. It will be appreciated by those skilled in the art, however, that a base station may serve for communicating across the air interface for more than one cell. For example, two cells may utilize resources situated at the same base station site.

In the present invention, at the time shown in FIG. 1, a user equipment unit (UE), such as user equipment unit (UE) 30, is utilizing common channels and therefore at any point in time communicates with only one base station (BS) 28 over a radio or air interface 32. Each of the radio interface 32, the Iu interface, the Iub interface, and the Iur interface are shown by dash-dotted lines in FIG. 1. At the time shown in FIG. 1, the user equipment unit (UE) 30 is registered with and using common channels via base station $28_{2\text{-}1}$. The cell served by base station $28_{2\text{-}1}$ is in the DRNS of drift radio network controller (DRNC) $26_2$.

The transport channels, physical channels, and logical channels above described are utilized in the UMTS Terrestrial Radio Access Network (UTRAN) 24 of FIG. 1, including the RACH and FACH common transport channels over the radio interface. Preferably, radio access is based upon wideband, Code Division Multiple Access (WCDMA) with individual radio channels allocated using CDMA spreading codes. Of course, other access methods may be employed. WCDMA provides wide bandwidth for multimedia services and other high transmission rate demands as well as robust features like diversity handoff and RAKE receivers to ensure high quality. Each user mobile station or equipment unit (UE) 30 is assigned its own scrambling code in order for a base station 28 to identify transmissions from that particular user equipment unit (UE) as well as for the user equipment unit (UE) to identify transmissions from the base station intended for that user equipment unit (UE) from all of the other transmissions and noise present in the same area.

Figure 2:
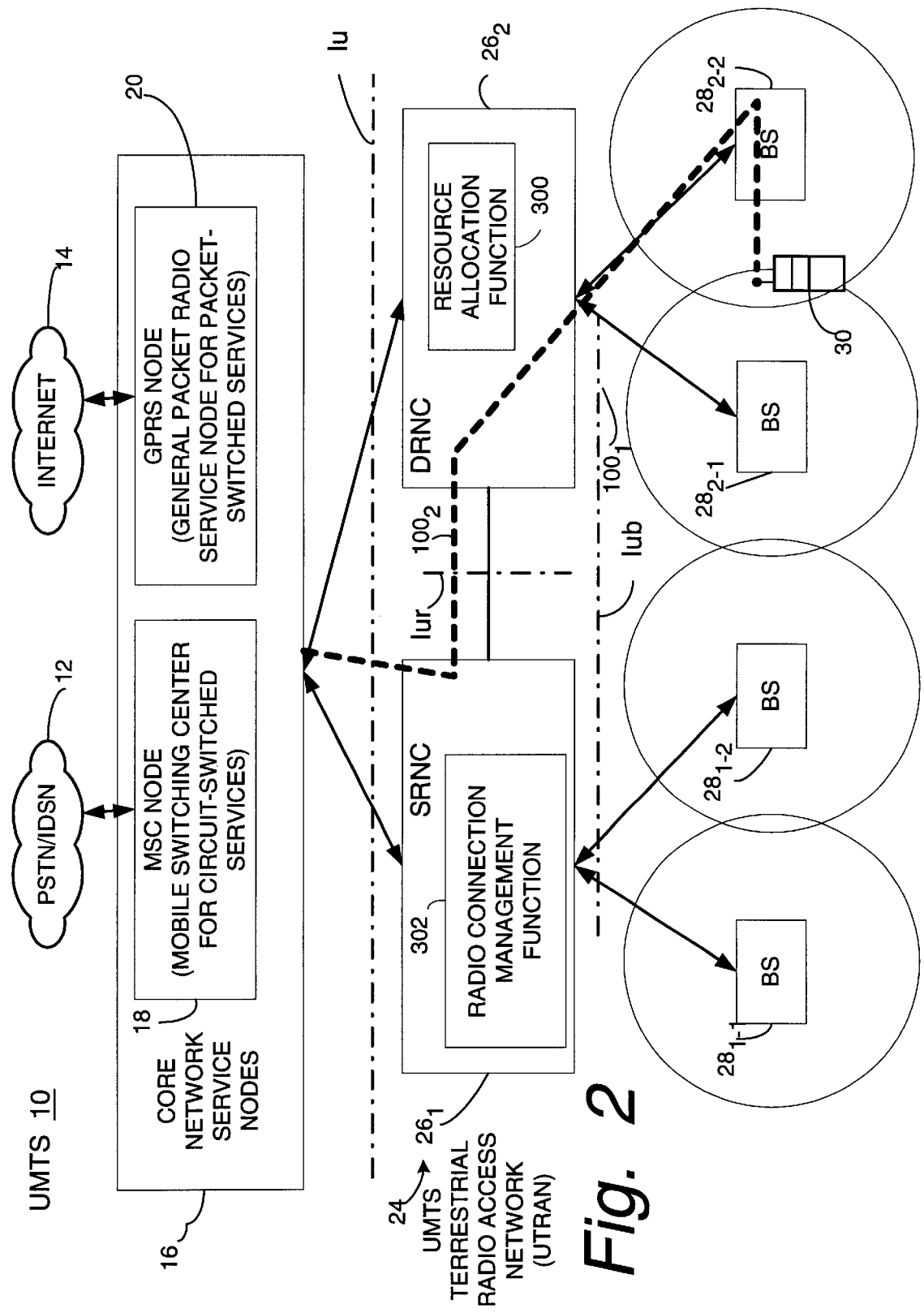
FIG. 2 is a simplified function block diagram of a portion of a UMTS Terrestrial Radio Access Network, including a user equipment unit (UE) station; a radio network controller; and a base station.

A user equipment unit (UE) may travel sufficiently far in a particular direction to register with another cell of the DRNS not previously visited by the user equipment unit (UE). FIG. 2 shows such a situation, in which user equipment unit (UE) 30 now seeks to register in the cell served by base station $28_{2\text{-}2}$. The cell served by base station $28_{2\text{-}2}$ is, like the cell of base station $28_{1\text{-}2}$, in the DRNS of drift radio network controller (DRNC) $26_2$.

Figure 3:
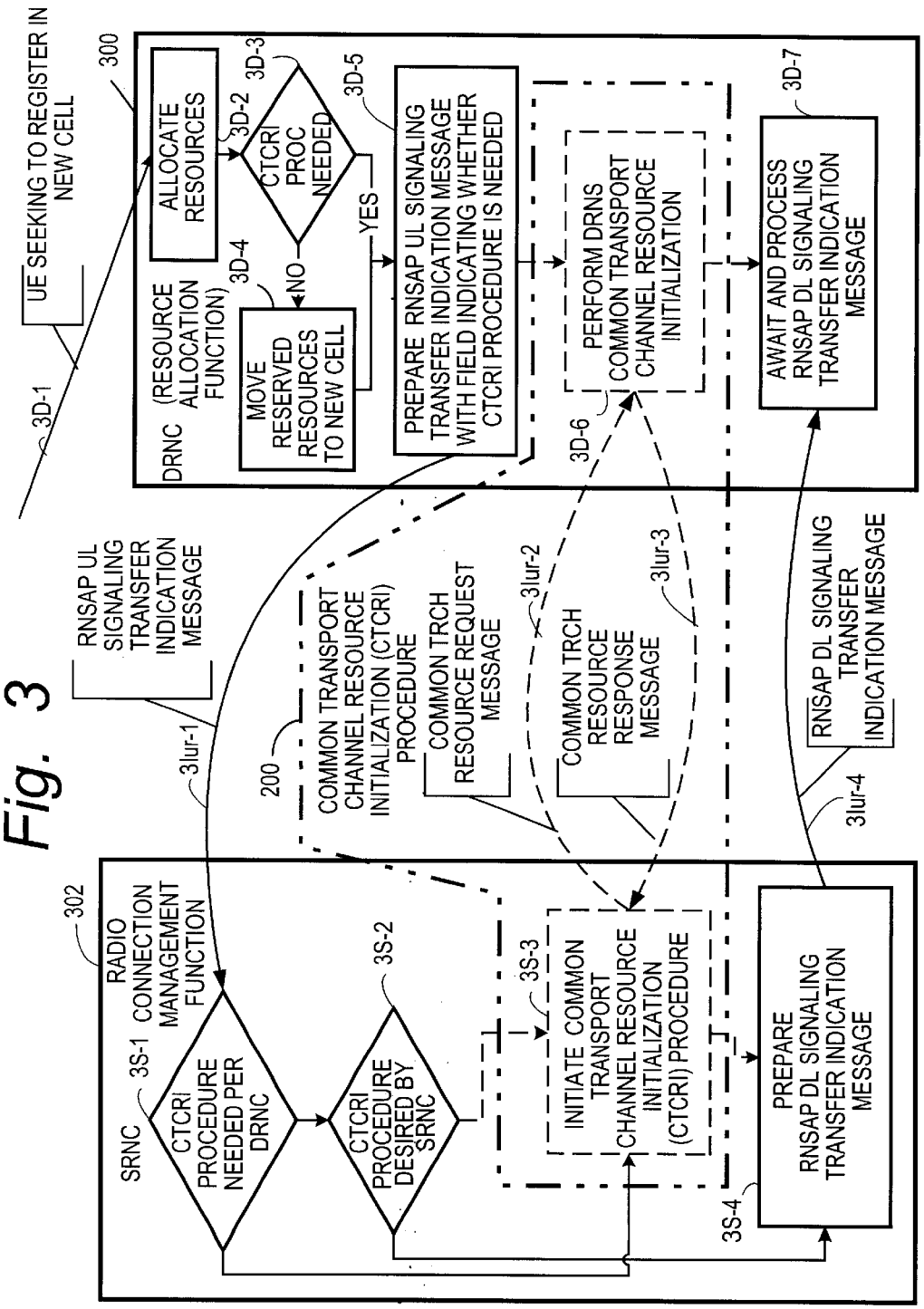
FIG. 3 is a diagrammatic view showing various events performed by a drift radio network controller (DRNC) and a serving radio network controller (SRNC) pertaining to travel of a user equipment unit (UE) into a cell controlled by the drift radio network controller (DRNC).

Whenever a user equipment unit (UE) utilizing common channels registers with a new cell controlled by drift radio network controller (DRNC) $26_2$ which the user equipment unit (UE) has not yet visited, the drift radio network controller (DRNC) $26_2$ must perform a resource allocation function in order to allocate radio network resources for the new cell. FIG. 3 shows certain basic event, steps, or operations performed in connection with an example resource allocation function 300 executed by drift radio network controller (DRNC) $26_2$, as well as correlative operations performed by a radio connection management function 302 at serving radio network controller (SRNC) 261.

FIG. 3 shows as event 3D-1 the resource allocation function 300 obtaining an indication that user equipment unit (UE) 30 seeks to register in a new cell controlled by drift radio network controller (DRNC) $26_2$. The new cell could be the first and thus the only cell controlled by drift radio network controller (DRNC) $26_2$ with which user equipment unit (UE) 30 has sought to register, or a further cell if registration of user equipment unit (UE) 30 has already occurred with respect to one cell controlled by drift radio network controller (DRNC) $26_2$. Upon receipt of such an indication, resource allocation function 300 as event 3D-2 begins to allocate resources to be used for a possible new cell for the radio connection to user equipment unit (UE) 30. The allocation of resources at event 3D-2 is typically rather minimal and preparatory, involving allocation of a few identifiers in the case of the first access in the new cell.

Concerning event 3D-1, one example way in which the resource allocation function 300 can obtain an indication that a user equipment unit (UE) is attempting to register in a new cell controlled by the drift radio network controller (DRNC) $26_2$ is for is the drift radio network controller (DRNC) $26_2$ to be involved in relaying a Radio Resource Control (RRC) protocol message via a cell which the user equipment unit (UE) was not previously using. One example of such a RRC protocol message is an RRC CELL-UPDATE message. Although the RRC message is terminated in the serving radio network controller (SRNC), the drift radio network controller (DRNC) can ascertain that it is a first message from the user equipment unit (UE) in a new cell.

As event 3D-3, the resource allocation function 300 determines if initiation (and hence execution) of the Common Transport Channel Resource Initialization Procedure will be needed, e.g., for the new cell utilized by the radio connection with user equipment unit (UE) 30. Initiation and execution of the Common Transport Channel Resource Initialization Procedure will be needed if the new cell is the first and thus the only cell controlled by drift radio network controller (DRNC) $26_2$ with which user equipment unit (UE) 30 has sought to register.

If registration of user equipment unit (UE) 30 has already occurred with respect to one cell controlled by drift radio network controller (DRNC) $26_2$ (e.g., drift radio network controller (DRNC) $26_2$ is already involved in the radio connection), the determination of event 3D-3 is based on considerations including those mentioned above, such as whether resources for the new cell (into which the user equipment unit (UE) moves) require a different Transport Block (TB) size or differing flow control information (as opposed to the TB size or flow control information for cell(s) of the DRNS already involved in the radio connection). For example, in many cases some or all of the S-CCPCHs in a DRNS are configured with the same Transport Block (TB) sizes, e.g., the same length restrictions, and same flow control information. In such situation, if a user equipment unit (UE) moves from a first cell in the DRNS to a second cell in the DRNS, and both the first cell and the second cell have the same Transport Block (TB) sizes and flow control considerations, there is no reason to update the information for the supported Transport Block (TB) size or flow control information. If it is determined at event 3D-3 that initiation of the Common Transport Channel Resource Initialization Procedure is not needed from the perspective of the drift RNC (DRNC), event 3D-3 is followed by event 3D-4. At event 3D-4, the resource allocation function 300 moves reserved resources to the new cell and ensures that the same Transport Block (TB) sizes can be used. Otherwise, event 3D-3 is followed by event 3D-5.

Event 3D-5 of resource allocation function 300, which follows either event 3D-3 or event 3D-4 as the case may be, depicts preparation of a signaling message to be sent from drift radio network controller (DRNC) $26_1$ to serving radio network controller (SRNC) $26_2$. In accordance with the present invention, the signaling message prepared by resource allocation function 300 at event 3D-5 includes a field, flag, or information element which advises serving radio network controller (SRNC) $26_1$ whether, from the perspective of drift radio network controller (DRNC) $26_2$ as determined at event 3D-3, initiation of the Common Transport Channel Resource Initialization Procedure will be necessary.

As one example, non-limiting implementation of the invention, the particular signaling message prepared and transmitted as event 3D-5 can be a RNSAP signaling message, and particularly a RNSAP UL SIGNALING TRANSFER INDICATION MESSAGE. The RNSAP UL SIGNALING TRANSFER INDICATION MESSAGE is used to transport a message sent by user equipment unit (UE) 30 to the UTRAN, e.g., the RRC protocol message mentioned above, when this RRC protocol message is sent on a specific channel over the radio interface. Actual transmission of the RNSAP UL SIGNALING TRANSFER INDICATION MESSAGE over the Iur Interface is depicted as event 3Iur-1 in FIG. 3.

Thus, in the example implementation, the field, flag, or information element would have a value which indicates whether or not there is need, from the perspective of the drift radio network controller (DRNC) $26_2$, to execute the Common Transport Channel Resource Initialization Procedure for the particular user equipment unit (UE) for which the RNSAP UL SIGNALING TRANSFER INDICATION MESSAGE contains an RRC protocol message. For example, such a flag can be set if need exists to initiate the Common Transport Channel Resource Initialization Procedure, or alternatively the flag could be cleared if there is no need (from the perspective of the drift radio network controller (DRNC) $26_2$) to initiate the Common Transport Channel Resource Initialization Procedure.

In addition to showing events associated with the resource allocation function 300, FIG. 3 further shows certain example basic, illustrative events and activities performed by the radio connection management function 302 of serving radio network controller (SRNC) $26_1$. The radio connection management function 302 performs activities which relate to registration in a new cell controlled by drift radio network controller (DRNC), and enablement by the UTRAN of usage of the FACH transport channel in the new cell (e.g., the cell which was the subject of the RRC CELL-UPDATE message). In this regard, FIG. 3 shows as event 3S-1 the serving radio network controller (SRNC) $26_1$ ascertaining, from the RNSAP UL SIGNALING TRANSFER INDICATION MESSAGE, whether the drift radio network controller (DRNC) $26_2$ requires initiation of the Common Transport Channel Resource Initialization Procedure. This determination is made by analyzing the content of the field, flag, or information element allocated to this purpose, as previously described concerning event 3D-3.

If the serving radio network controller (SRNC) $26_1$ ascertains that, from the perspective of the drift radio network controller (DRNC) $26_2$, initiation of the Common Transport Channel Resource Initialization Procedure is not required, as event 3S-2 the serving radio network controller (SRNC) $26_1$ has an opportunity to determine whether the serving radio network controller (SRNC) $26_1$ itself deems initiation of the Common Transport Channel Resource Initialization Procedure to be necessary or advisable. An example determination for event 3S-2 can include the serving radio network controller (SRNC) $26_1$ determining that a new transport bearer is required over the Iur Interface. In this regard, the serving radio network controller (SRNC) $26_1$ is aware of the load conditions on the various transport bearers which it manages. So even if the drift radio network controller (DRNC) $26_2$ indicates that initiation of the Common Transport Channel Resource Initialization Procedure is not necessary, if the serving radio network controller (SRNC) $26_1$ wants to use a new transport bearer the serving radio network controller (SRNC) $26_1$ will initiate the Common Transport Channel Resource Initialization Procedure in order to get the necessary parameters from the resource allocation function 300 of drift radio network controller (DRNC) 26$_2$.

If it is determined, either by event 3S-1 or event 3S-2, that initiation of Common Transport Channel Resource Initialization Procedure is necessary or desired, SRNC initiates the Common Transport Channel Resource Initialization Procedure as indicated by event 3S-3. The Common Transport Channel Resource Initialization Procedure is a RNSAP which involves both the serving radio network controller (SRNC) and the drift radio network controller (DRNC), and which accordingly is depicted simply as being framed by dashed-double dotted line 200 in FIG. 3. Details of the Common Transport Channel Resource Initialization Procedure are understood by those familiar with UTRAN technology, and therefore not described herein. Initiation and execution of the Common Transport Channel Resource Initialization Procedure involves transmission of two signaling messages between the serving radio network controller (SRNC) 26$_1$ and the drift radio network controller (DRNC) 26$_2$ over the Iur Interface. These two signaling messages are the COMMON TRCH RESOURCE REQUEST MESSAGE and the COMMON TRCH RESOURCE RESPONSE MESSAGE. Transmissions of these two messages are illustrated as events 3Iur-2 and 3Iur-3, respectively, in FIG. 3.

When it is necessary for serving radio network controller (SRNC) 26$_1$ to initiate the Common Transport Channel Resource Initialization Procedure, the resource allocation function 300 performed by drift radio network controller (DRNC) 26$_2$ performs DRNS common transport channel resource initialization activities, as depicted by event 3D-6 in FIG. 3. As part of its DRNS common transport channel resource initialization activities, the drift radio network controller (DRNC) 26$_2$ makes resource reservations and sends (in the COMMON TRCH RESOURCE RESPONSE MESSAGE of event 3Iur-3) the information required by serving radio network controller (SRNC) 26$_1$ for performance of the Common Transport Channel Resource Initialization Procedure at event 3S-3. Insofar as the resource reservations are concerned, as part of event 3D-5, the drift radio network controller (DRNC) 26$_2$ reserves some capacity on the RACH/FACH channel in the new cell for user equipment unit (UE) 30, allocates, e.g., buffer space in the DRNC and allocates credits to the SRNC. The information sent to the serving radio network controller (SRNC) as part of event 3D-6 includes the aforementioned information concerning supported Transport Block (TB) sizes and flow control information.

In the case that it is determined at both event 3s-1 and event 3S-2 that initiation of the Common Transport Channel Resource Initialization Procedure is not required or desired, and after execution of the Common Transport Channel Resource Initialization Procedure in those situations in which it is required or desired, event 3S-4 is eventually performed. Event 3S-4 involves serving radio network controller (SRNC) 26, preparing a RNSAP DL SIGNALING TRANSFER INDICATION MESSAGE for transmission to drift radio network controller (DRNC) 26$_2$. Transmission of the RNSAP DL SIGNALING TRANSFER INDICATION MESSAGE is depicted as event 3Iur-4 in FIG. 3. As event 3D-7, resource allocation function 300 performed by drift radio network controller (DRNC) 26$_2$ awaits and processes the RNSAP DL SIGNALING TRANSFER INDICATION MESSAGE in customary manner. For example, the RNSAP DL SIGNALING TRANSFER INDICATION MESSAGE can include a RRC CELL-UPDATE CONFIRM message to be sent over the radio interface to user equipment unit (UE) 30.

Thus, in the illustrative embodiment of the invention described above, the drift radio network controller (DRNC) 26$_2$ signals to the serving radio network controller (SRNC) 26$_1$ whether the drift radio network controller (DRNC) requires the initiation of the Common Transport Channel Resource Initialization Procedure when a user equipment unit (UE) 30 registers in a new cell controlled by the drift radio network controller (DRNC) 26$_2$. If such signaling indicates that the drift radio network controller (DRNC) does not require initiation of the Common Transport Channel Resource Initialization Procedure, the Common Transport Channel Resource Initialization Procedure need not be performed solely for the sake of the drift radio network controller (DRNC). However, in view of its own considerations, the serving radio network controller (SRNC) can nevertheless initiate the Common Transport Channel Resource Initialization Procedure. Thus, in instances in which initiation of the Common Transport Channel Resource Initialization Procedure is not necessary from the perspective of the drift radio network controller (DRNC), the serving radio network controller (SRNC) can optionally initiate the Common Transport Channel Resource Initialization Procedure in view of its own discretionary considerations.

Thus, in accordance with the present invention, initiation of the Common Transport Channel Resource Initialization Procedure is not mandatory but rather optional. For this reason, the Common Transport Channel Resource Initialization Procedure (depicted by line 200 in FIG. 3) and generation/transmission of the COMMON TRCH RESOURCE REQUEST MESSAGE and the COMMON TRCH RESOURCE RESPONSE MESSAGE shown as events 3Iur-2 and 3Iur-3, respectively, are represented by broken lines in FIG. 3. In the prior art, by contrast, all messages shown in FIG. 3 are required. In comparison with the prior art practice which mandated all four Iur signaling messages in FIG. 3, the present invention can result in as much as fifty percent reduction in such Iur signaling.

In one example implementation, the present invention includes an indication in an existing RNSAP signaling message like the UL SIGNALING TRANSFER INDICATION MESSAGE whether or not, from the perspective of the drift radio network controller (DRNC), invocation by the serving radio network controller (SRNC) of the Common Transport Channel Resource Initialization Procedure is required. In such type implementation the present invention does not involve any new signaling. Moreover, the drift radio network controller (DRNC) is enabled to indicate to the serving radio network controller (SRNC), upon mobility of the user equipment unit (UE) to a new cell, whether (from the perspective of the drift radio network controller (DRNC) the Common Transport Channel Resource Initialization Procedure must be executed.

Handling the credit situation may become an issue in one or more scenarios discussed above, such as a scenario arising when the serving RNC (SRNC) determines at event 3S-2 that initiation of the Common Transport Channel Resource Initialization Procedure is needed, e.g., for a new transport bearer. The person skilled in the art will appreciate that there may be several ways to resolve such issues. One way, for example, would be to continue with the already allocated credits resulting from event 3D-2. Another way would be to re-initialize the flow control mechanisms.

The present invention thus decreases the signaling performed between the serving radio network controller (SRNC) and drift radio network controller (DRNC) when a user equipment unit (UE) moves from one cell under control of the drift radio network controller (DRNC) to another cell under control of the drift radio network controller (DRNC) while using the RACH/FACH common transport channels over the radio interface. The invention enables a large decrease (up to as much as fifty percent) in the amount of signaling between the serving radio network controller (SRNC) and drift radio network controller (DRNC) while the user equipment unit (UE) is using the FACH (which can be utilized in combination with RACH or CPCH) by eliminating the need to execute the Common Transport Channel Resource Initialization Procedure at every cell change under the drift radio network controller (DRNC).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. For use in a radio access network of a cellular telecommunications system, the radio access network supporting a radio connection with a user equipment unit (UE), the radio connection being controlled by a serving radio network controller (SRNC) comprising the radio access network, a method comprising:
   (1) a drift radio network controller (DRNC) signaling to the serving radio network controller (SRNC) whether the drift radio network controller (DRNC) requires initiation of a Common Transport Channel Resource Initialization Procedure when the user equipment unit (UE) seeks to use a forward access channel (FACH) common transport channel in a cell controlled by the drift radio network controller (DRNC);
   (2) if the signaling of step (1) indicates that the drift radio network controller (DRNC) does not require initiation of the Common Transport Channel Resource Initialization Procedure, not executing the Common Transport Channel Resource Initialization Procedure with respect to the user equipment unit (UE) in the cell.

2. The method of claim 1, further comprising utilizing an existing signaling message between the drift radio network controller (DRNC) and the serving radio network controller (SRNC) to perform the signaling of step (1).

3. The method of claim 2, further comprising utilizing a radio network subsystem application protocol (RNSAP) uplink (UL) Signaling Transfer message sent from the drift radio network controller (DRNC) to the serving radio network controller (SRNC) to perform the signaling of step (1).

4. The method of claim 1, further comprising the drift radio network controller (DRNC) determining whether the drift radio network controller (DRNC) requires initiation of the Common Transport Channel Resource Initialization Procedure, the determining being based on differences in one or more of the following for cells controlled by the drift radio network controller (DRNC):
   (a) length restrictions of data transported over the FACH transport channel;
   (b) flow control conditions.

5. The method of claim 1, further comprising, regardless of the signaling of step (1), the serving radio network controller (SRNC) initiating the Common Transport Channel Resource Initialization Procedure if the serving radio network controller (SRNC) determines that a new transport bearer is required over an interface between the serving radio network controller (SRNC) and the drift radio network controller (DRNC).

6. For use in a radio access network of a cellular telecommunications system, the radio access network supporting a radio connection with a user equipment unit (UE), the radio connection being controlled by a serving radio network controller (SRNC) comprising the radio access network, a method comprising:
   (1) a drift radio network controller (DRNC) signaling to the serving radio network controller (SRNC) whether the drift radio network controller (DRNC) requires initiation of a Common Transport Channel Resource Initialization Procedure when the user equipment unit (UE) seeks to use a forward access channel (FACH) common transport channel in a cell controlled by the drift radio network controller (DRNC);
   (2) if the signaling of step (1) indicates that the drift radio network controller (DRNC) does not require initiation of the Common Transport Channel Resource Initialization Procedure, optionally not executing, at discretion of the serving radio network controller (SRNC), the Common Transport Channel Resource Initialization Procedure with respect to the user equipment unit (UE) in the cell.

7. The method of claim 6, further comprising utilizing an existing signaling message between the drift radio network controller (DRNC) and the serving radio network controller (SRNC) to perform the signaling of step (1).

8. The method of claim 7, further comprising utilizing a radio network subsystem application protocol (RNSAP) uplink (UL) Signaling Transfer message sent from the drift radio network controller (DRNC) to the serving radio network controller (SRNC) to perform the signaling of step (1).

9. The method of claim 6, further comprising the drift radio network controller (DRNC) determining whether the drift radio network controller (DRNC) requires initiation of the Common Transport Channel Resource Initialization Procedure, the determining being based on differences in one or more of the following for cells controlled by the drift radio network controller (DRNC):
   (a) length restrictions of data transported over the FACH transport channel;
   (b) flow control conditions.

10. The method of claim 6, further comprising, regardless of the signaling of step (1), the serving radio network controller (SRNC) initiating the Common Transport Channel Resource Initialization Procedure if the serving radio network controller (SRNC) determines that a new transport bearer is required over an interface between the serving radio network controller (SRNC) and the drift radio network controller (DRNC).

11. A radio access network of a cellular telecommunications system which supports a radio connection with a user equipment unit (UE), the radio connection being controlled by a serving radio network controller (SRNC) comprising the radio access network, characterized in that:
   a drift radio network controller (DRNC) comprising the radio access network signals to the serving radio network controller (SRNC) whether the drift radio network controller (DRNC) requires initiation of a Common Transport Channel Resource Initialization Procedure when the user equipment unit (UE) seeks to use a forward access channel (FACH) common transport channel in a cell controlled by the drift radio network controller (DRNC);
   if the drift radio network controller (DRNC) does not require initiation of the Common Transport Channel Resource Initialization Procedure, the serving radio network controller (SRNC) not initiating the Common Transport Channel Resource Initialization Procedure with respect to the user equipment unit (UE) in the cell.

12. The radio access network of claim 11, further characterized in that an existing signaling message between the drift radio network controller (DRNC) and the serving radio network controller (SRNC) signals whether the drift radio network controller (DRNC) requires the initiation of the Common Transport Channel Resource Initialization Procedure.

13. The radio access network of claim 11, wherein the existing signaling message is a radio network subsystem application protocol (RNSAP) uplink (UL) Signaling Transfer message sent from the drift radio network controller (DRNC) to the serving radio network controller (SRNC).

14. The radio access network of claim 11, wherein the drift radio network controller (DRNC) makes a determination whether the drift radio network controller (DRNC) requires initiation of the Common Transport Channel Resource Initialization Procedure, the determination being based on differences in one or more of the following for cells controlled by the drift radio network controller (DRNC):

(a) length restrictions of data transported over the FACH transport channel;

(b) flow control conditions.

15. The radio access network of claim 11, wherein the serving radio network controller (SRNC), regardless of whether the drift radio network controller (DRNC) requires initiation of the Common Transport Channel Resource Initialization Procedure the signaling of step (1), initiates the Common Transport Channel Resource Initialization Procedure if the serving radio network controller (SRNC) determines that a new transport bearer is required over an interface between the serving radio network controller (SRNC) and the drift radio network controller (DRNC).

16. A radio access network of a cellular telecommunications system which supports a radio connection with a user equipment unit (UE), the radio connection being controlled by a serving radio network controller (SRNC) comprising the radio access network, characterized in that:

a drift radio network controller (DRNC) comprising the radio access network signals to the serving radio network controller (SRNC) whether the drift radio network controller (DRNC) requires the initiation of a Common Transport Channel Resource Initialization Procedure when the user equipment unit (UE) seeks to use a forward access channel (FACH) common transport channel in a cell controlled by the drift radio network controller (DRNC);

if the drift radio network controller (DRNC) does not require initiation of the Common Transport Channel Resource Initialization Procedure, the serving radio network controller (SRNC) optionally not initiating, in accordance with discretion of the serving radio network controller (SRNC), the Common Transport Channel Resource Initialization Procedure with respect to the user equipment unit (UE) in the cell.

17. The radio access network of claim 16, further characterized in that an existing signaling message between the drift radio network controller (DRNC) and the serving radio network controller (SRNC) to signal whether the drift radio network controller (DRNC) requires the initiation of the Common Transport Channel Resource Initialization Procedure.

18. The radio access network of claim 17, wherein the existing signaling message is a radio network subsystem application protocol (RNSAP) uplink (UL) Signaling Transfer message sent from the drift radio network controller (DRNC) to the serving radio network controller (SRNC).

19. The radio access network of claim 16, wherein the drift radio network controller (DRNC) makes a determination whether the drift radio network controller (DRNC) requires initiation of the Common Transport Channel Resource Initialization Procedure, the determination being based on differences in one or more of the following for cells controlled by the drift radio network controller (DRNC):

(a) length restrictions of data transported over the FACH transport channel;

(b) flow control conditions.

20. The radio access network of claim 11, wherein the serving radio network controller (SRNC), regardless of whether the drift radio network controller (DRNC) requires initiation of the Common Transport Channel Resource Initialization Procedure initiates the Common Transport Channel Resource Initialization Procedure if the serving radio network controller (SRNC) determines that a new transport bearer is required over an interface between the serving radio network controller (SRNC) and the drift radio network controller (DRNC).

* * * * *